United States Patent [19]

Walker

[11] Patent Number: 4,530,279

[45] Date of Patent: Jul. 23, 1985

[54] BREAKAWAY MECHANISM FOR A TWINE WRAPPING APPARATUS

[75] Inventor: James D. Walker, Lancaster, Pa.

[73] Assignee: Sperry Corporation, Holland, Pa.

[21] Appl. No.: 654,298

[22] Filed: Sep. 25, 1984

[51] Int. Cl.³ .............................................. B65B 13/18
[52] U.S. Cl. ........................................ 100/5; 100/88
[58] Field of Search ................. 100/5, 13, 88; 56/341, 56/342, 343

[56] References Cited

U.S. PATENT DOCUMENTS

| 4,062,279 | 12/1977 | Grube | 100/5 |
|---|---|---|---|
| 4,158,331 | 6/1979 | Campbell | 100/5 |
| 4,253,389 | 3/1981 | Campbell | 100/5 |

Primary Examiner—Billy J. Wilhite
Attorney, Agent, or Firm—Darrell F. Marquette; Frank A. Seemar; Larry W. Miller

[57] ABSTRACT

A breakaway mechanism for a twine wrapping apparatus on a roll baling machine couples a twine dispensing member to a pinion which is in intermeshing engagement with a gear rack. The pinion and the gear rack cooperate to effect pivoting movement of the twine dispensing member. The breakaway mechanism permits the twine dispensing member to be uncoupled from the pinion when a predetermined load is exerted on the twine dispensing member during its pivoting movement.

5 Claims, 17 Drawing Figures

BREAKAWAY MECHANISM FOR A TWINE WRAPPING APPARATUS

BACKGROUND OF THE INVENTION

This invention relates generally to roll baling machines typically referred to as round balers which form cylindrical roll bales of crop material. In particular, this invention relates to a breakaway mechanism for a twine wrapping apparatus on such roll baling machines.

U.S. Pat. No. 4,062,279 discloses a breakaway mechanism including a first lever fixed at one end to a sleeve which in turn is secured to a rotatable shaft carrying a twine tube. A second lever is coupled to the other end of the first lever opposite the sleeve by a coupling device in the form of a ball that is spring loaded against the first lever. A hub, fixed to the second lever, receives the sleeve fixed to the first lever. The second lever is connected to a hydraulic cylinder for effecting pivoting movement of the twine tube. If the twine tube encounters an obstruction during its pivoting movement that is sufficient to overcome the spring loading on the ball of the coupling device, the first lever breaks away from the second lever and the twine tube remains stationary while the second lever and the hub rotate about the sleeve fixed to the first lever. A disadvantage of this breakaway mechanism is that it is difficult to accurately adjust the spring loading on the ball. Another disadvantage of this breakaway mechanism is that it is rather large and thus occupies an excessive amount of space.

SUMMARY OF THE INVENTION

The present invention is directed to an improved breakaway mechanism for a twine wrapping apparatus of a roll baling machine. The twine wrapping apparatus includes a twine dispensing member, and a pinion and a gear rack in intermeshing engagement for effecting pivoting movement of the twine dispensing member. The improved breakaway mechanism couples the twine dispensing member to the pinion while permitting the twine dispensing member to be uncoupled from the pinion when a predetermined load is exerted on the twine dispensing member during its pivoting movement. The breakaway mechanism includes a plate secured to the twine dispensing member with projections formed thereon for engagement in grooves formed in the pinion. A spring is also provided in the breakaway mechanism to urge the projections on the plate into the grooves in the pinion.

DESCRIPTION OF THE PREFERRED EMBODIMENT

Figure 1:
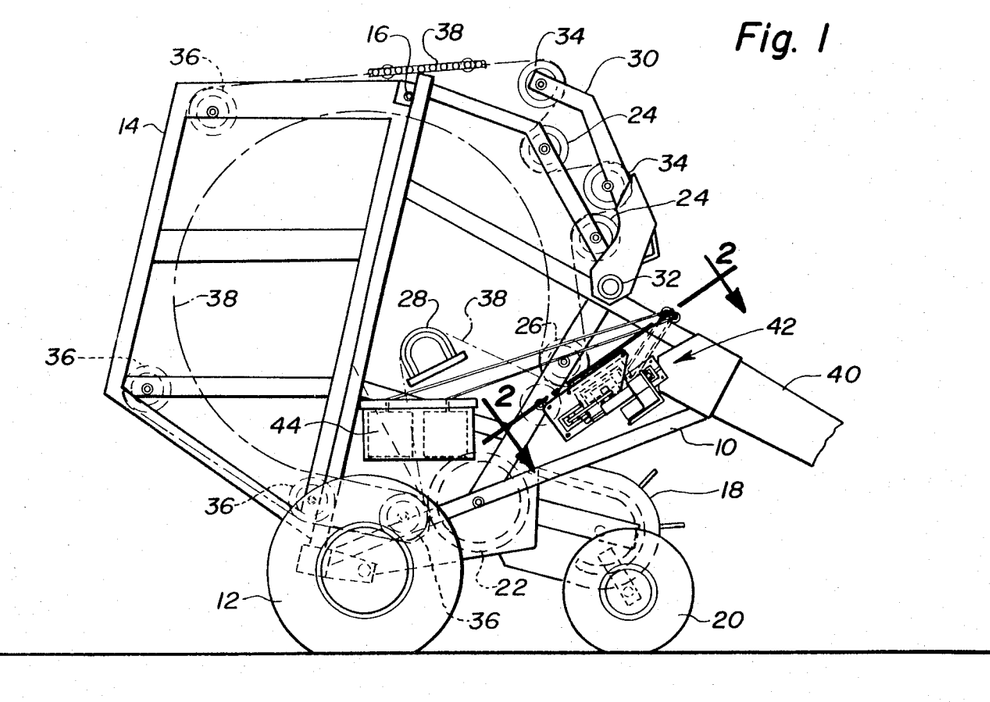
FIG. 1 is a side elevation view of a roll baling machine incorporating the preferred embodiment of the breakaway mechanism of the present invention.

Referring to FIG. 1, a roll baling machine incorporating the preferred embodiment of the present invention includes a base frame 10 supported by a pair of wheels 12, and a rear frame 14 pivotally connected at 16 to the base frame 10 by suitable bearings. A pickup unit 18 is mounted on the base frame 10 and is supported by wheels 20. A floor roller 22, guide members 24, and drive sprockets 26 are rotatably mounted on the base frame 10. Also, cam guide members 28 are supported on the base frame 10. An arm assembly 30 is rotatably mounted on the base frame 10 by a tube 32, and the arm assembly 30 carries guide members 34 which are rotatable. A plurality of guide members 36 are rotatably supported on the rear frame 14. A bale forming apron 38 is movably supported on the drive sprockets 26, the guide members 24,34 and 36, and the cam guide members 28. The bale forming apron 38 is preferably comprised of a pair of endless link type chains connected at spaced intervals by transverse bars or slats. When the machine is empty, the apron 38 is supported on the cam guide members 28 to define a bale chamber having an initial wedge shape in side elevation. During bale formation, the apron 38 is lifted off the cam guide member 28 as the base chamber expands to a generally cylindrical shape.

Figure 2:
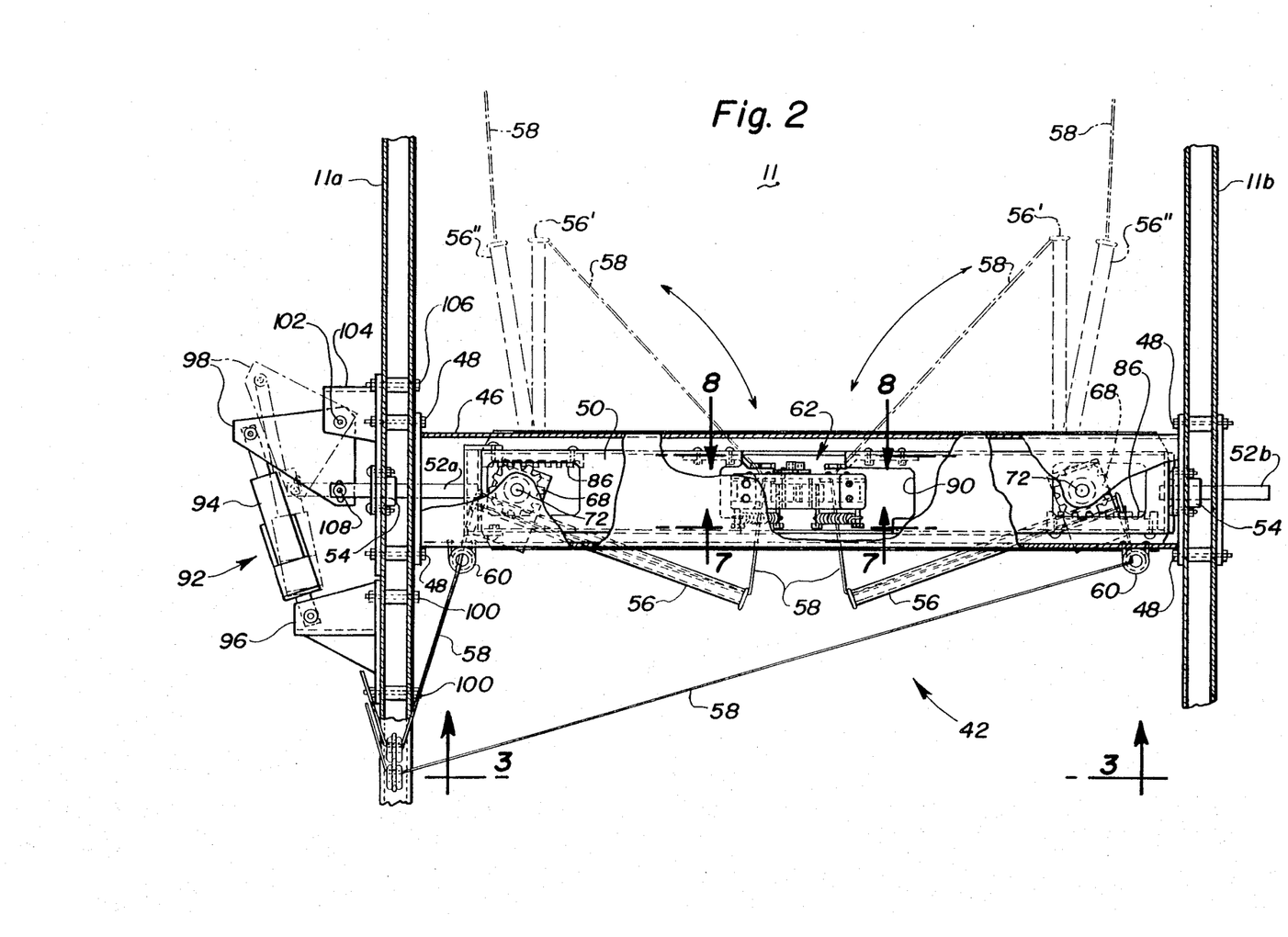
FIG. 2 is an enlarged sectional view taken on lines 2—2 of FIG. 1.
Figure 3:
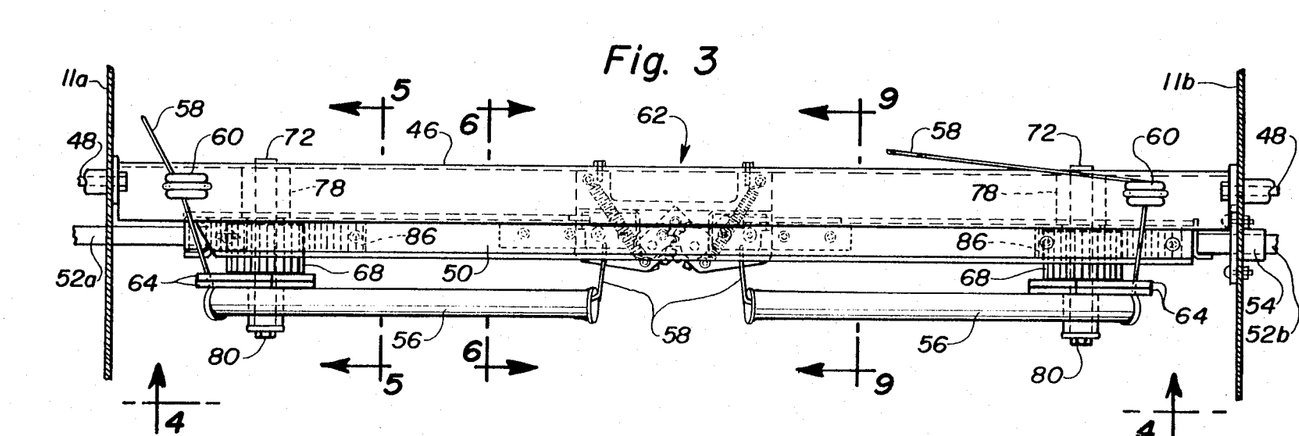
FIG. 3 is a view taken on lines 3—3 of FIG. 2.
Figure 4:
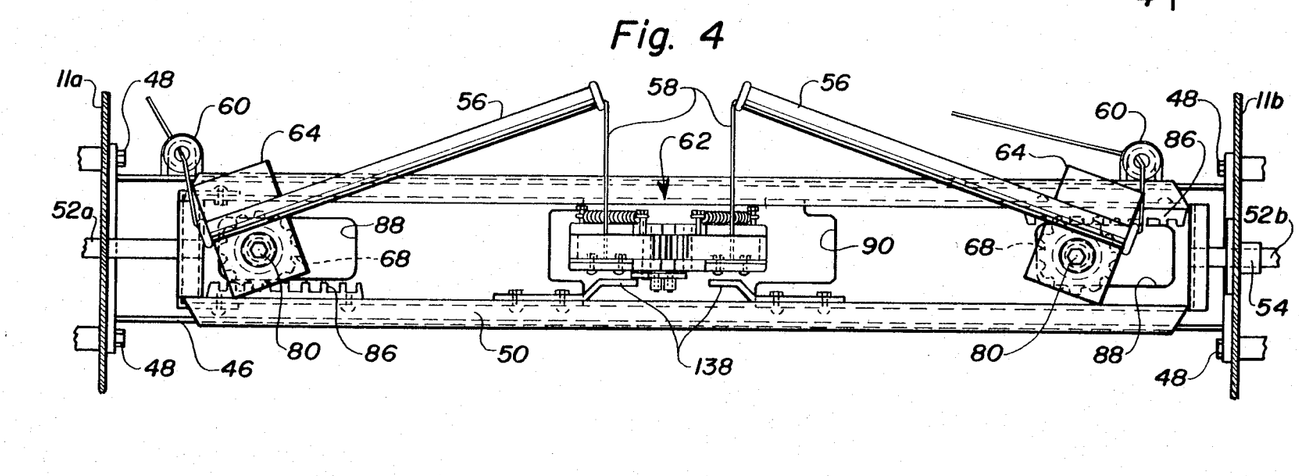
FIG. 4 is a view taken on lines 4—4 of FIG. 3.
Figure 5:
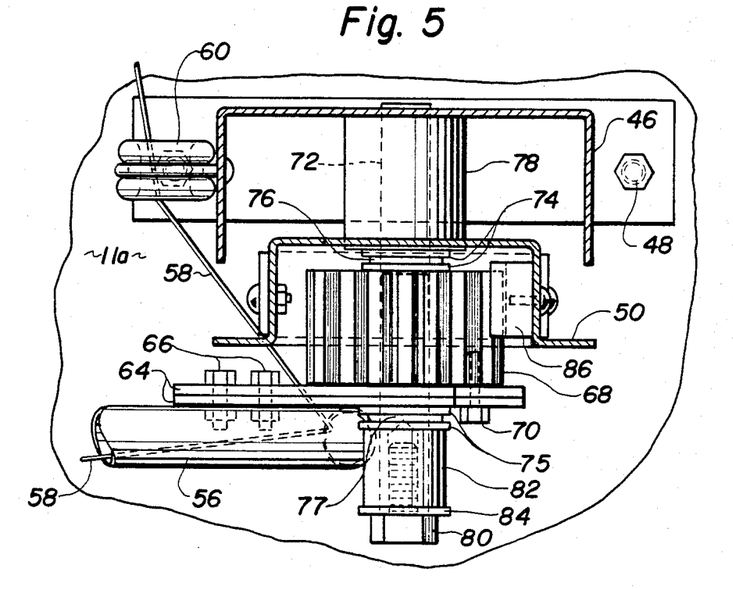
FIG. 5 is an enlarged sectional view taken on lines 5—5 of FIG. 3.

A twine wrapping apparatus 42 is supported on the base frame 10 and a twine box 44 is provided for supplying twine to the twine wrapping apparatus 42. As seen in FIGS. 2, 3, and 4, the twine wrapping apparatus 42 includes a support beam 46 which extends transversely between the side walls 11a, 11b of the base frame 10 and is connected thereto by bolts 48. As seen in FIG. 5, the beam 46 is of a generally inverted U-shaped cross section. The twine wrapping apparatus 42 also includes a shuttle member 50 which is supported at its ends by rods 52a, 52b slidably disposed in bearings 54 mounted in the side walls 11a, 11b for permitting movement of the shuttle member 50 generally transversely of the base frame 10 in the space 11 defined between the side walls 11a, 11b. As seen in FIG. 5, the shuttle member 50 is generally channel or top hat-shaped in cross section. Twine dispensing members such as twine tubes or arms 56 are rotatably supported on the support beam 46, and strands of twine 58 extend from the twine box 44 through twine guides 60 mounted on the support beam 46, then through the twine tubes 56 and into a cut and clamp mechanism 62 which is also supported on the support beam 46.

The twine tubes 56 are each welded to the lower one of a pair of plates 64 as seen in FIG. 5, and the plates 64 are connected to each other by bolts 66. The plates 64 are fixed to pinions 68 by bolts 70, only one bolt 70 being shown in FIG. 5. The pinions 68 are rotatably mounted on shafts 72 which are fixed at their upper ends to the support beam 46. A pair of washers 74 and a bearing member 76 are disposed between the upper side of each pinion 68 and a stabilizer block 78 which is positioned between the uppermost washer 74 and the support beam 46. Another pair of washers 75 and another bearing member 77 are disposed underneath the lowermost plate 64, and a bolt 80 is threaded into the bottom end of each shaft 72. A spacer collar 82 and a washer 84 are disposed between the lowermost washer 75 and the head of each bolt 80. When the bolts 80 are tightened into the shafts 72, the twine tubes 56 are, in effect, fixed to and will rotate with the pinions 68 as will be described later. The shuttle member 50 carries gear racks 86 which have teeth in intermeshing engagement with the teeth of the pinions 68. As seen in FIG. 4, openings 88 are provided in the top of the shuttle member 50 near the ends thereof to accommodate the stabilizer blocks 78, and another opening 90 is provided in the top of the shuttle member 50 near the center thereof to accommodate the cut and clamp mechanism 62.

Referring now to FIG. 2, the mechanism 92 for actuating the twine wrapping apparatus 42 includes a linear actuator 94 which is pivotably connected at one end to a bracket 96 and at the other end to a lever arm 98. The bracket 96 is secured to side wall 11a of the base frame 10 by bolts 100. The lever arm 98 is pivotably connected by a pin 102 to a bracket 104 which is fixed to the side wall 11a of the base frame 10 by two of the bolts 48 and by a further bolt 106. The lever arm 98 is also pivotably connected by a pin 108 to the end of the rod 52a which extends through the side wall 11a of the base frame 10. When the linear actuator 94 is extended as shown in FIG. 2, the lever arm 98 is pivoted on pin 102 from the position shown in full lines to the phantom position thereby moving the shuttle member 50 generally transversely toward the side wall 11a of the base frame 10. This causes the gear racks 86 on the shuttle member 50 to move in a direction which will cause concurrent rotation of the pinions 68 on the shafts 72 in opposite directions with respect to each other. Such rotation of the pinions 68 will cause simultaneous pivoting movement of the twine tubes 56 in opposite directions with respect to each other from their home or rest positions shown in full lines to their dispensing positions shown in phantom at 56". Subsequent contraction of the linear actuator 94 will move the shuttle member 50 back toward the side wall 11b of the base frame 10 and thereby cause simultaneous pivoting movement of the twine tubes 56 back to their home or rest positions shown in full lines.

Figure 6:
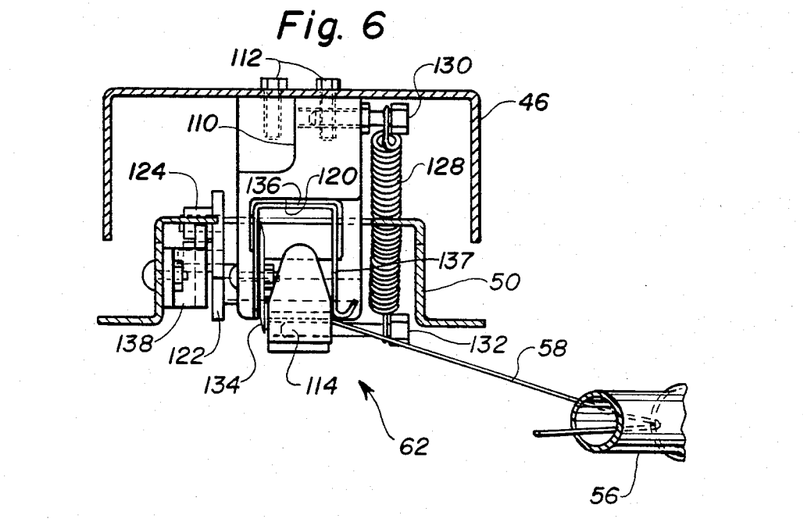
FIG. 6 is an enlarged sectional view taken on lines 6—6 of FIG. 3.
Figure 7:
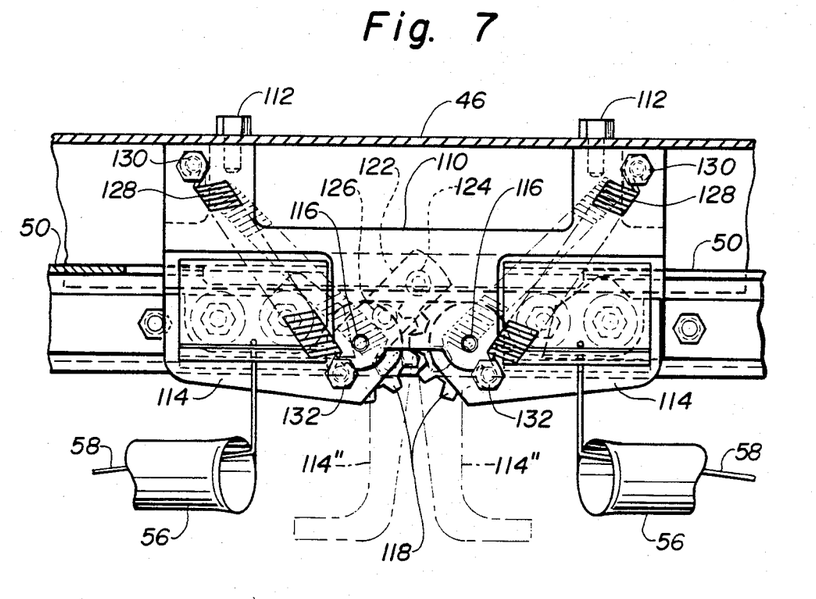
FIG. 7 is an enlarged sectional view taken on lines 7—7 of FIG. 2.
Figure 8:
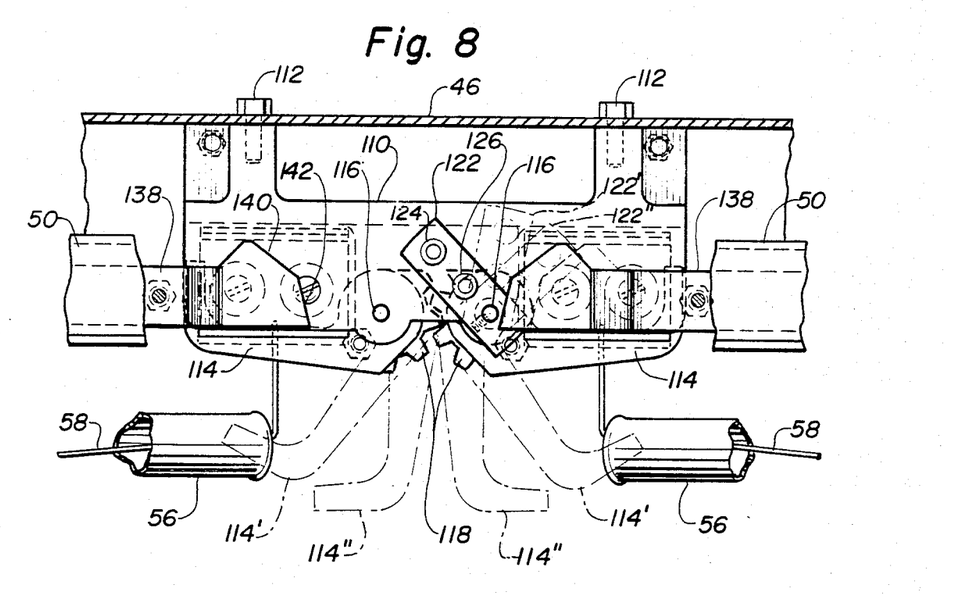
FIG. 8 is an enlarged sectional view taken on lines 8—8 of FIG. 2.

As seen in FIGS. 6, 7, and 8, the cut and clamp mechanism 62 includes a body member 110 which is fastened to the support beam 46 by four bolts 112. A pair of arms 114 are mounted on pins 116 which are pivoted on the body member 110. Intermeshing spur gears 118 are fixed to the arms 114. Pockets 120 are provided in the bottom of the body member 110 to accommodate portions of the arms 114 when they are pivoted to the closed positions shown in full lines in FIGS. 7 and 8. A lever 122 is fixed to one of the pins 116, and carries rollers 124 and 126. Tension springs 128 are connected between bolts 130 which are fastened to the body member 110 and bolts 132 which are connected to the arms 114. As best seen in FIG. 6, cutting members such as knives 134 and generally U-shaped spring clips 136 having resilient legs 137 are fastened to the body member 110 and are disposed in the pockets 120. A pair of cam members 138 are secured to the shuttle member 50. Each of the cam members 138 has a first cam surface 140 and a second cam surface 142 arranged for engaging the rollers 124 and 126, respectively, on the lever 122.

When the shuttle member 50 is moved toward the right in FIG. 8, the cam surface 140 on the left-hand cam member 138 engages the roller 124 on the lever 122 and pivots the lever 122 to the position shown in phantom at 122'. Further movement of the shuttle member 50 toward the right in FIG. 8 causes the cam surface 142 on the left-hand cam member 138 to engage the roller 126 on the lever 122 thereby pivoting the lever 122 to the position indicated in phantom at 122". This pivoting movement of the lever 122 causes the intermeshing spur gears 118 to be rotated, resulting in concurrent pivoting movement of the arms 114 to their partially open positions shown in phantom at 114' and finally to their fully open positions indicated in phantom at 114". As the arms 114 are pivoted to their fully open positions 114", the springs 128 seen in FIG. 7 will move slightly over center with respect to the pins 116 and will hold the arms 114 in that position. Subsequent opposite movement of the shuttle member 50 toward the left in FIG. 8 will result in the right-hand cam member 138 pivoting the arms 114 back toward their closed positions shown in full lines. As the arms 114 reach their partially open positions 114', the springs 128 will move sufficiently back over center with respect to the pins 116 to quickly snap the arms 114 back into their closed positions.

Figure 9:
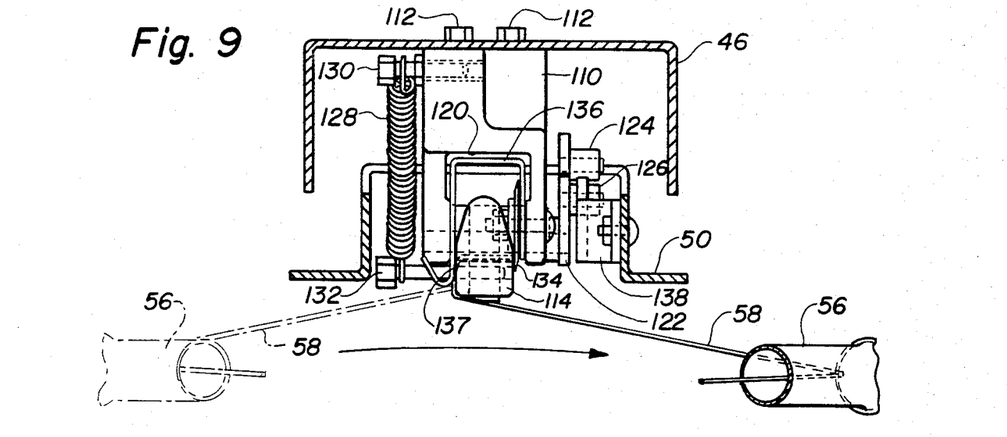
FIG. 9 is an enlarged sectional view taken on lines 9—9 of FIG. 3.
Figure 10:
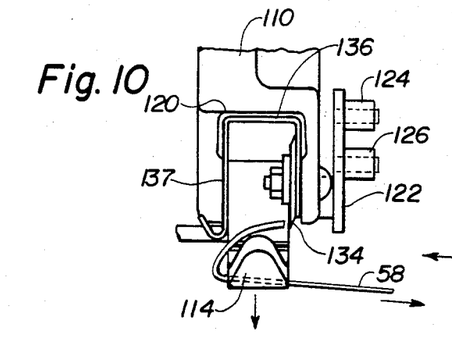
FIGS. 10-13 are schematic views of the mechanism shown in FIGS. 6-9.
Figure 11:
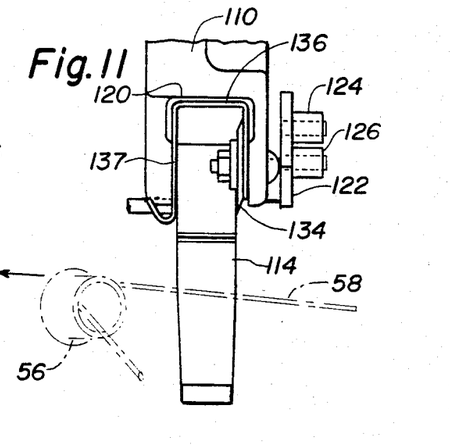
Figure 12:
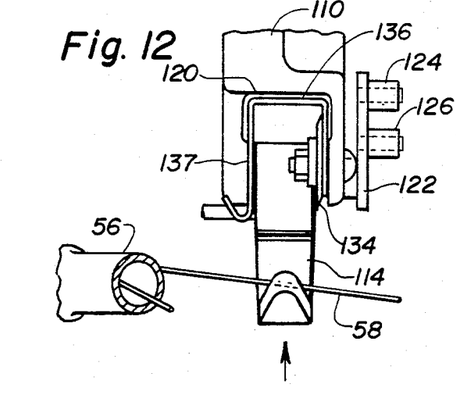
Figure 13:
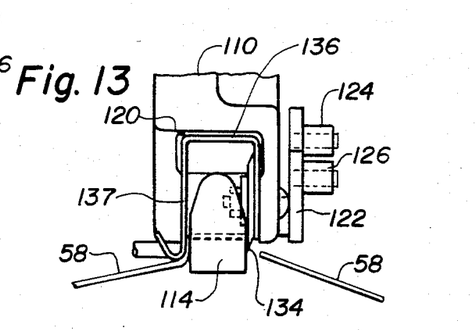

The twine cutting and clamping operation of the cut and clamp mechanism 62 will be best understood by referring to FIGS. 9-13. As seen in FIG. 9, the strands of twine 58 are each initially clamped between an edge of one of the arms 114 and the resilient leg 137 of one of the spring clips 136 when the arms 114 are in their closed positions. As the arms 114 move toward their partially open positions, as shown in FIG. 10, the strands of twine 58 are released. The strands of twine 58 remain released as the arms 114 move to their fully open position shown in FIG. 11 and also as the arms 114 move back toward their closed position as shown in FIG. 12. As the arms 114 are snapped back into their closed position by the springs 128 as shown in FIG. 13, each strand of twine 58 is cut by a rapid shearing or scissors type action between an edge of one of the arms 114 and the cutting edge of one of the knives 134 while being simultaneously clamped between the other edge of the arm 114 and the resilient leg 137 of the spring clip 136.

During the formation of a roll bale in the machine of FIG. 1, the twine tubes 56 are disposed in their home or rest positions shown in full lines in FIG. 2 and the arms 114 are in their closed positions so that the strands of twine 58 are clamped in the cut and clamp mechanism 62. When the roll bale has been completed and it is desired to wrap the bale with twine, the linear actuator 94 is extended thereby moving the shuttle member 50 toward the sidewall 11a of the base frame 10. This movement of the shuttle member 50 causes the twine tubes 56 to be pivoted, due to the gear racks 86 and the pinions 68, toward the positions indicated in phantom at 56' in FIG. 2 while the strands of twine 58 remain clamped in the cut and clamp mechanism 62. By clamping the strands of twine 58 in the cut and clamp mechanism 62 while the twine tubes 56 are moved from their home positions to their phantom positions 56', relatively long twine tails are generated on the strands of twine 58. Further movement of the shuttle member 50 toward the sidewall 11a of the base frame 10 causes the twine tubes 56 to be pivoted to their dispensing positions shown in phantom at 56" in FIG. 2. As the twine tubes 56 move from the phantom positions 56' to their dispensing positions 56", the arms 114 are moved from their closed positions to their fully open positions 114" and the strands of twine 58 are released from the cut and clamp mechanism 62. The twine tails are fed into the bale chamber in order to be caught between the floor roller 22 and the rotating bale. The linear actuator 94 is then contracted to move the shuttle member 50 back toward the sidewall 11b of the base frame 10 and thereby pivot the twine tubes 56 from their dispensing positions 56" back toward their home positions shown in full lines in FIG. 2. During this pivoting movement of the twine tubes 56, twine is wrapped around the base in a spiral manner. As the twine tubes 56 reach their home positions, the arms 114 are snapped back to their closed positions by the springs 128 and the strands of twine 58 are simultaneously cut and clamped in the cut and clamp mechanism 62. The wrapped bale is then discharged from the machine by pivoting the rear frame 14 upwardly in a known manner. The twine wrapping apparatus 42 is ready to wrap the next bale with twine.

It will be understood that the linear actuator 94 may be in the form of an electric servomotor or a hydraulic piston and cylinder unit. Furthermore, the linear actuator 94 may take the form of a manual device such as a threaded rod.

Figure 14:
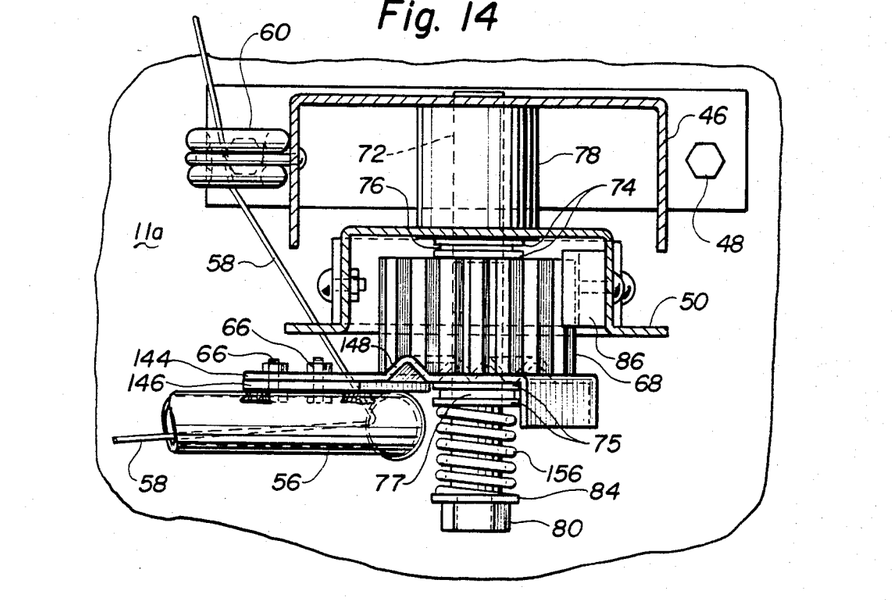
FIGS. 14 and 15 are enlarged sectional views similar to FIG. 5 showing the breakaway mechanism of the present invention.

Referring to FIGS. 14–17, the breakaway mechanism of the present invention will be described. The plates 64 shown in FIG. 5 are replaced by plates 144,146 secured together by the bolts 66. Plate 144 has projections 148 formed threon on opposite sides of a hole 150 which receives the shaft 72. The pinions 68 have grooves 152 formed in their bottom surfaces on opposite sides of a hole 154 therethrough. The grooves 152 in the pinions 68 are shaped to receive the projections 148 on the plates 144. A spring 156 replaces the spacer collar 82 shown in FIG. 5. The spring 156 is compressed between the lower washer 75 and the washer 84 so that it normally urges the projections 148 on the plate 144 firmly into the grooves 152 in the pinions 68 as seen in FIG. 14. This keeps the twine tubes 56 coupled to the pinions 68 under normal conditions. The force that the spring 156 exerts on the plate 144 may be adjusted by increasing or decreasing the number of washers 84, thereby changing the effective length of the spring 156. It should be noted that the bolt 80 is drawn up snugly into the shaft 72.

Figure 15:
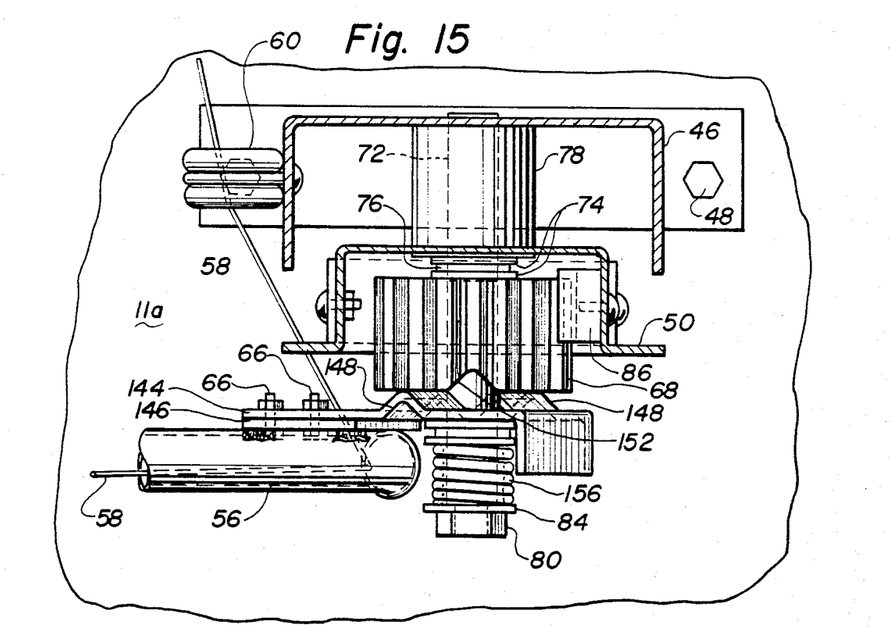
Figure 16:
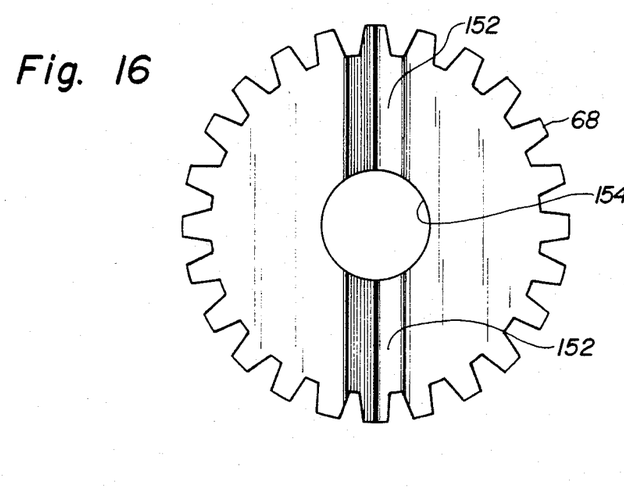
FIGS. 16 and 17 are further enlarged views of various parts of the breakaway mechanism shown in FIGS. 14 and 15.
Figure 17:
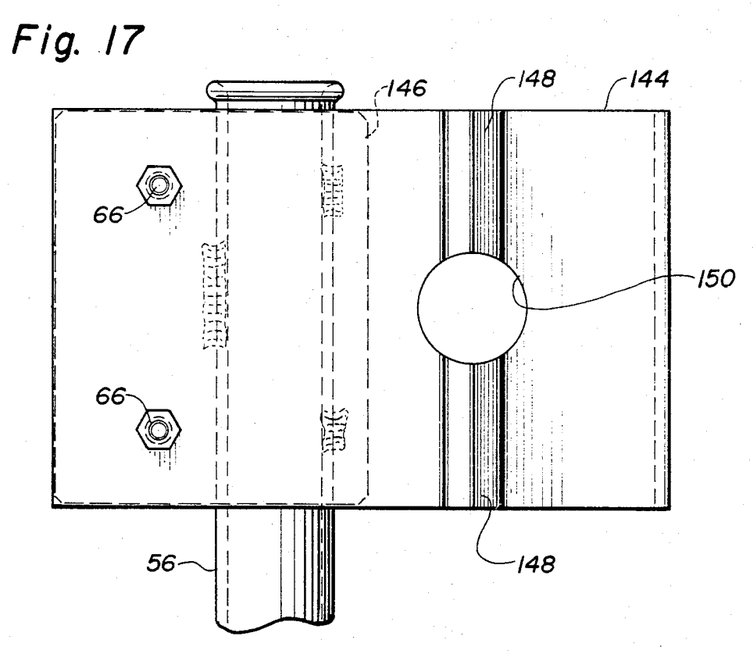

Should either one of the twine tubes 56 engage an obstruction such as a wad of crop material during pivoting movement between their home positions shown in full lines in FIG. 2 and their dispensing positions 56" shown in phantom in FIG. 2, that twine tube 56 will be uncoupled from the associated pinion 68 if the obstruction exerts a load on the twine tube 56 which overcomes the spring 156. As illustrated in FIG. 15, the twine tube 56 is uncoupled from the pinion 68 by compressing the spring 156 so that the projections 148 on the plates 144 are disengaged from the grooves 152 in the pinion 68. When the twine tube 56 is uncoupled from the pinion 68, the pinion 68 will still be rotated on the shaft 72 by the gear rack 86 but the plates 144,146 and the twine tube 56 will remain stationary. After the obstruction has been removed, the breakaway mechanism may be reset by manually pivoting the twine tube 56 in a direction to reengage the projections 148 on the plate 144 in the grooves 152 in the pinion 68.

It will also be understood that although the preferred embodiment of the twine wrapping apparatus employs two twine tubes 56, the twine wrapping apparatus may employ only one twine tube or any other number of twine tubes.

The following claims are intended to cover all modifications and variations of the preferred embodiments of the invention without departing from the spirit and scope of the invention.

Having thus described the invention, what is claimed is:

1. In a roll baling machine having a twine dispensing member, a pinion and a gear rack in intermeshing engagement for effecting pivoting movement of said twine dispensing member, the improvement comprising:
   mechanism coupling said twine dispensing member to said pinion while permitting said twine dispensing member to be uncoupled from said pinion when a predetermined load is exerted on said twine dispensing member during said pivoting movement thereof.

2. The improvement of claim 1, said mechanism comprising a plate secured to said twine dispensing member, said plate having projections formed thereon for engagement in grooves formed in said pinion.

3. The improvement of claim 2, said mechanism further comprising a spring for urging said projections into said grooves.

4. The improvement of claim 3, which said predetermined load is sufficient to overcome said spring and thereby cause said projections on said plate to be disengaged from said grooves in said pinion.

5. In a roll baling machine, the combination comprising:
   a twine dispensing member;
   a pinion and a gear rack in intermeshing engagement for effecting pivoting movement of said twine dispensing member; and
   mechanism coupling said twine dispensing member to said pinion while permitting said twine dispensing member to be uncoupled from said pinion when a predetermined load is exerted on said twine dispensing member during said pivoting movement thereof.

* * * * *